June 15, 1965 C. G. MILLER 3,189,687

TELEPHONE SWITCHING SYSTEM

Filed Feb. 2, 1962 7 Sheets-Sheet 1

INVENTOR
Charles G. Miller
BY
Pennie, Edmonds, Morton, Barrows & Taylor
ATTORNEYS INVENTOR.
Charles G. Miller
BY
Pennie, Edmonds, Morton, Barrows & Taylor
ATTORNEYS June 15, 1965 C. G. MILLER 3,189,687

TELEPHONE SWITCHING SYSTEM

Filed Feb. 2, 1962 7 Sheets-Sheet 3

INVENTOR.
Charles G. Miller
BY
Pennie, Edmonds, Morton, Barrows & Taylor
ATTORNEYS

TELEPHONE SWITCHING SYSTEM

Filed Feb. 2, 1962

INVENTOR.
Charles G. Miller
BY
Pennie, Edmonds, Morton, Barrows & Taylor
ATTORNEYS INVENTOR.
Charles G. Miller
BY
Pennie, Edmonds, Morton, Barrows & Taylor
ATTORNEYS INVENTOR.
Charles G. Miller
BY
Pennie, Edmonds, Morton, Barrows & Taylor
ATTORNEYS June 15, 1965 C. G. MILLER 3,189,687

TELEPHONE SWITCHING SYSTEM

Filed Feb. 2, 1962

7 Sheets-Sheet 7

*INVENTOR.*

Charles G. Miller

*BY* Pennie, Edmonds, Morton, Barrows & Taylor

ATTORNEYS

United States Patent Office 3,189,687
Patented June 15, 1965

3,189,687

TELEPHONE SWITCHING SYSTEM

Charles G. Miller, 51 Aubrey Road, Upper Montclair, N.J.

Filed Feb. 2, 1962, Ser. No. 170,635
6 Claims. (Cl. 179—18)

This invention relates to telephone systems and more particularly to means for preventing the establishment of unauthorized calls.

With the increased use of telephone switching networks for interconnecting data processing equipment and for interconnecting military bases it becomes desirable that connections between calling stations and called stations be set up over the regular switching network, with protection against unauthorized calls, rather than over private networks. While such connections may, of course, be established under the control of dialed or keyed designations, there is always the possibility that unauthorized connections to the important called stations may be set up either accidentally, or maliciously by dialing or keying the designations of such stations.

This invention provides for interconnecting an originating station with a terminating station via a regular commercial telephone switched network, with protection against unauthorized station selection, either accidental or malicious.

It provides for the following features:

(a) Automatic identification of the calling station number via a passive electrical network.

(b) Transmitting this identification to a tandem switching office, where it is held until a directive signal is received from the terminating switching office to forward this identity to this terminating switching office.

(c) In the advancement of a data call, to generate at the originating tandem point an extra and distinctive multifrequency signal which it forwards through the switch train to the switching office just before the terminating office and causes this office to control the entry into the terminating office via a separate group of trunks to cause the selection of a new type of incoming register and associated translator with features called for in this invention.

(d) On receipt of the called number, to generate a signal to the tandem office at which the identified calling number is held in order to direct this tandem office to forward the calling number identity to the terminating office.

(e) At the terminating office, a translator which matches the identity received with one or more recorded identities associated with the particular called number.

(f) At the terminating office, withholding the completion to the called number unless the calling number match indicates that the originating station is authorized to reach the particular called number.

These and other features of the invention will be more clearly understood from a consideration of the following description, read in connection with the accompanying drawings, in which—

Figure 1:
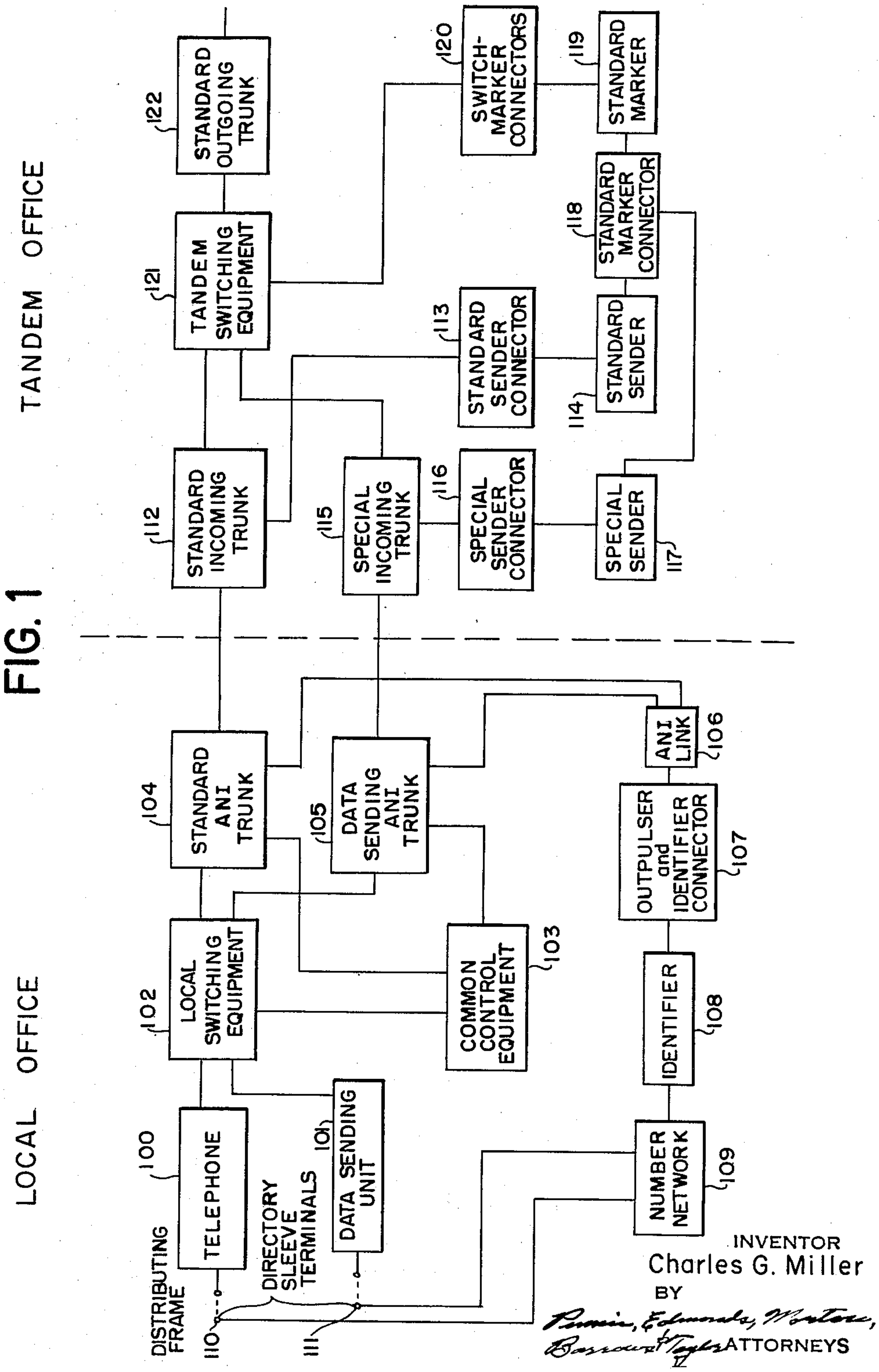
FIGS. 1 and 2 are a schematic showing of the system as a whole.
Figure 2:
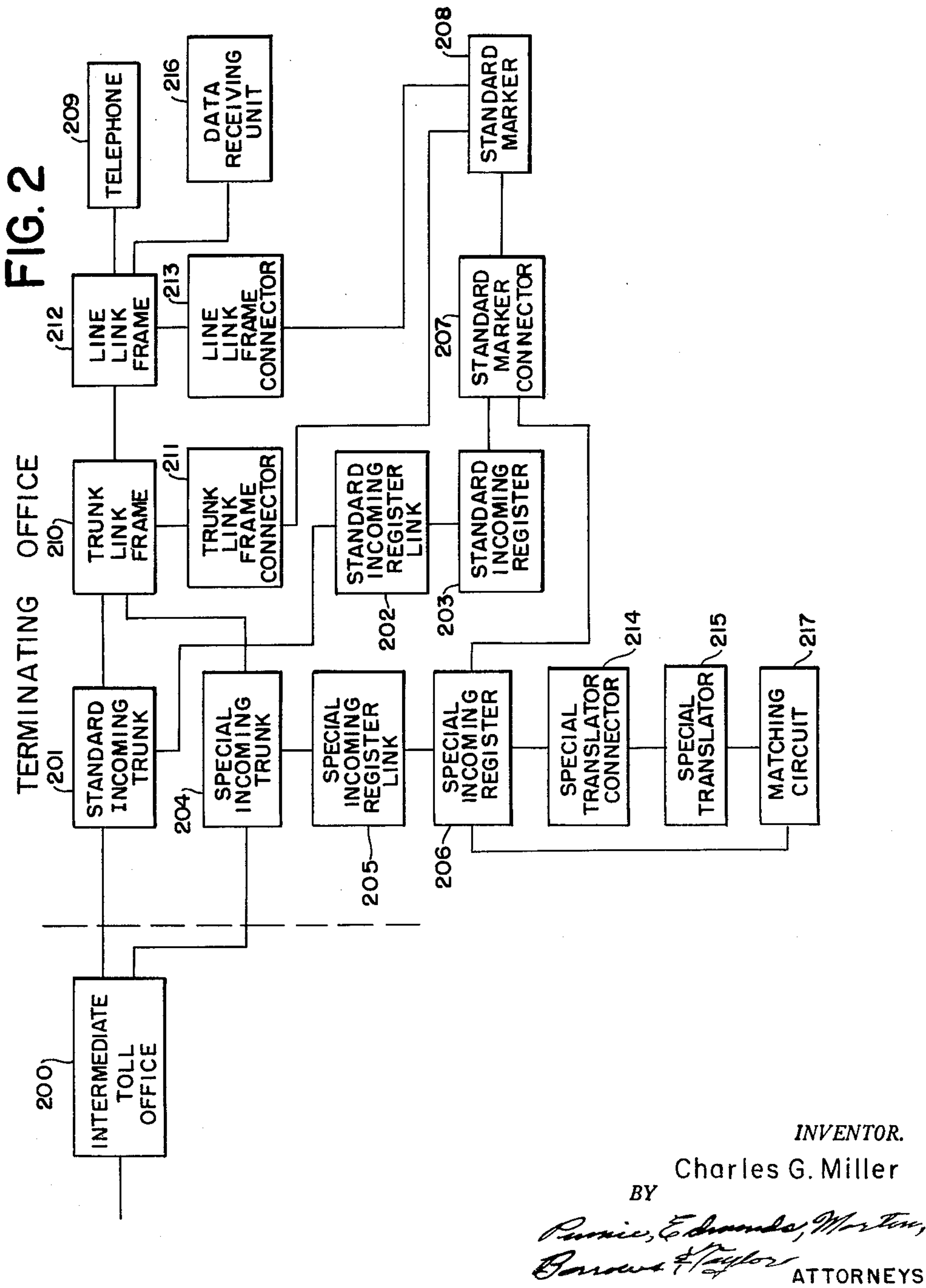

Referring first to FIGS. 1 and 2, two subscriber substations are shown, of which substation 100 represents an ordinary telephone, while substation 101 represents a substation equipped with a data sending unit. Both substations are connected to local switching equipment 102, which is controlled by common control equipment 103. This local office is also provided with automatic number identifying equipment including outgoing trunks 104 and 105, link 106, outpulser 107, identifier 108, and number network 109. For the purpose of number identification, each substation has an individual directory sleeve terminal such as terminals 110 and 111 which are connected to number network 109. Each substation is also associated, in the local switching equipment, with a class terminal (not shown) which determines the class of service to which the substation is entitled. Therefore, when the telephone substation 100 originates a call to a distant office, that substation will be extended to a standard trunk, such as trunk 104, while the data sending substation 101, for a call to a distant office, will be extended to a special trunk, such as trunk 105.

At the tandem office, special senders, such as sender 117 are used for handling data sending calls. Therefore, the standard incoming trunks, such as trunk 112, and the special incoming trunks, such as trunk 115, to which data sending calls are routed by the originating office, are arranged in separate groups. Standard incoming trunks use one sender connector, such as standard sender connector 113, to reach standard senders, such as sender 114. Special incoming trunks use a similar, but separate sender connector, identified as special sender connector 116, to reach special senders, such as sender 117. The standard senders and the special senders, in establishing connections through the tandem office, function in a similar manner and employ, in common, standard marker connectors, such as connector 118 and standard markers, such as marker 119. Marker 119 controls the tandem switching equipment 121, obtaining access thereto by means of connectors 120. Both types of call are extended over standard outgoing trunks, such as trunk 122. It may be assumed that the tandem office is provided with centralized automatic message accounting equipment, and that the automatic line identification equipment at the local office transmits the calling station number to the tandem office for charging purposes. Since the accounting operations do not enter into the invention, they have not been disclosed. However, in the accounting operations the calling station identity is cleared when the accounting record has been made, but in this invention the calling station identity is held and the tandem sender is held facing the outgoing connection until it recognizes from the terminating end a signal requesting the transmission forward of the calling identity.

The call may be extended through one or more intermediate toll offices such as office 200. These offices are modified to receive and transmit a special signal generated by the special tandem sender to indicate that a data sending call is being established. Between intermediate offices, standard interoffice trunks are used. When the last intermediate office determines that the call is to be directed to the terminating office, the special signal is not transmitted, but a special trunk circuit is selected. If no special signal has been received, the intermediate office selects a standard trunk to the terminating office.

At the terminating office, the standard trunk, selected by the intermediate office, appears in standard incoming trunk circuit 201, which connects itself, by means of standard incoming register link 202 with a standard incoming register, such as register 203. Similarly, the special trunk, selected by the intermediate office appears in a special incoming trunk, such as trunk 204, which connects itself by means of special incoming register link 205 with a special incoming register, such as register 206. Link 205 differs from link 202 only in that it serves special trunks and special incoming registers.

Standard incoming register 203 receives the called line number from the intermediate office and at once operates standard marker connector 207 to connect with standard marker 208. Marker 208 functions to locate and test the called line such as telephone 209, and connects with the trunk link frame 210, in which the incoming trunk 201 appears, by means of trunk link frame connector 211. It also connects with line link frame 212, in which the called link 209 appears by means of line link frame connectors 213, after which it selects an idle channel between trunk 201 and line 209 and completes the connection.

The special incoming register 206 also receives the called line number from the intermediate office. As each intermediate office completes its functions, it establishes talking and signaling paths therethrough. On standard calls, the tandem office has already extended these talking and signaling paths to the originating office. On the special data sending calls, forming the subject of the present invention, the special sender 117 remains connected to the outgoing trunk.

Having received the called line number, special incoming register 206 transmits a signal to the special sender 117, in response to which the special sender 117 transmits the calling line number to the incoming register 206. In the meantime, register 206 has operated special translator connector 214 to connect with a special translator 215. The register 206 then transfers the called line number to the translator, which is wired to set up a registration of the number of the calling line which is privileged to extend calls to the data receiving unit 216. When the calling line number has been received from the tandem office and the translator has operated, the two calling line numbers are set up in matching circuit 217. If the matching circuit indicates that the two calling line numbers are the same, the register 206 operates marker connector 207 to connect with marker 208 and the marker proceeds to connect special incoming trunk 204 with the data receiving unit 216. Register 206 also transmits a "match" signal to the tandem office to permit the special sender 117 to release and complete the connection with the originating office.

If the matching circuit 217 indicates that the two calling line numbers presented to it are not the same, the register is given a trouble release signal and a "no match" signal is transmitted to the tandem sender. The tandem sender then causes a trouble record to be made, after which the calling line is given an indication that the call cannot be completed.

The detailed drawings are based on dial telephone circuits in general use. Reference may be made to U.S. Patent No. 2,848,543, granted to R. N. Breed et al. August 19, 1958, for a typical tandem office; to U.S. Patent No. 2,868,884, granted to J. W. Gooderham et al. January 13, 1959, for a typical toll office and to U.S. Patent No. 2,585,904 granted to A. J. Busch February 19, 1952, for a typical local office. For details of the automatic number identification equipment reference may be made to an article appearing in The Bell System Technical Journal, September 1958, page 1295.

The invention also contemplates the possibility of the use of four-wire transmission throughout the telephone network as well as other forms of automatic line number identification.

When the common control equipment at the originating office has received a call from the data sending unit 101 and has registered the number of the wanted line, for example that of data receiving unit 216, it will also receive a class indication. Assuming that the call must be routed through the tandem office, the common control equipment will select a special trunk outgoing to the tandem office and prepare an outpulsing circuit over the outgoing conductors of the special trunk.

Figure 3:
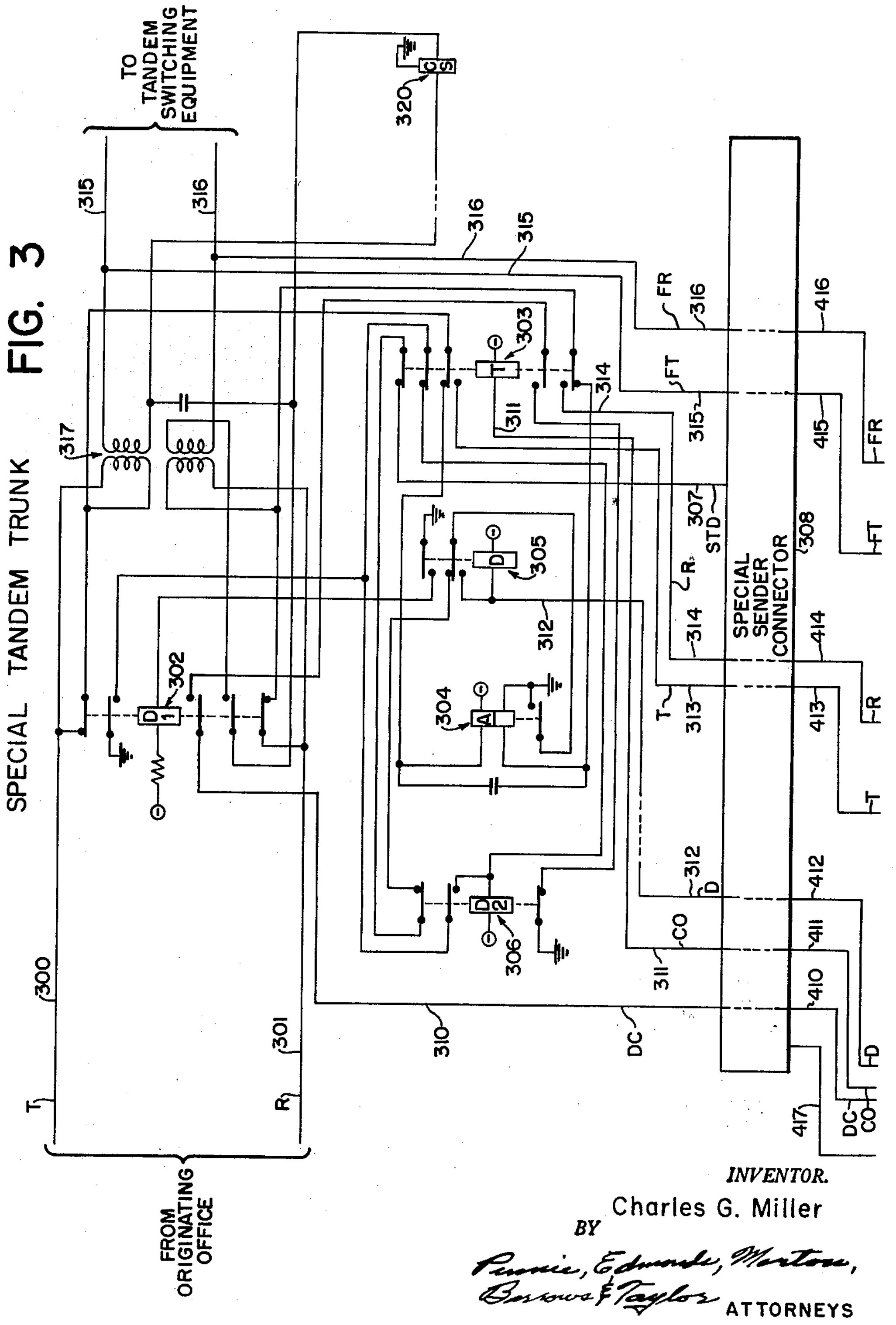
FIG. 3 shows a special trunk incoming to a tandem office.

At the special tandem trunk of FIG. 3, this prepared outpulsing circuit results in the completion of a circuit from battery, through the upper winding of relay 304, back contact of relay 303, back contact of relay 302, trunk conductor 300, through the common control equipment at the originating office, back to conductor 301, back contact of relay 302, back contact of relay 303, to ground through the lower winding of relay 304. Relay 304 operates in this circuit and closes a circuit from ground over its front contact, back contact of relay 305, back contact of relay 306, back contact of relay 303 to conductor 307.

Figure 4:
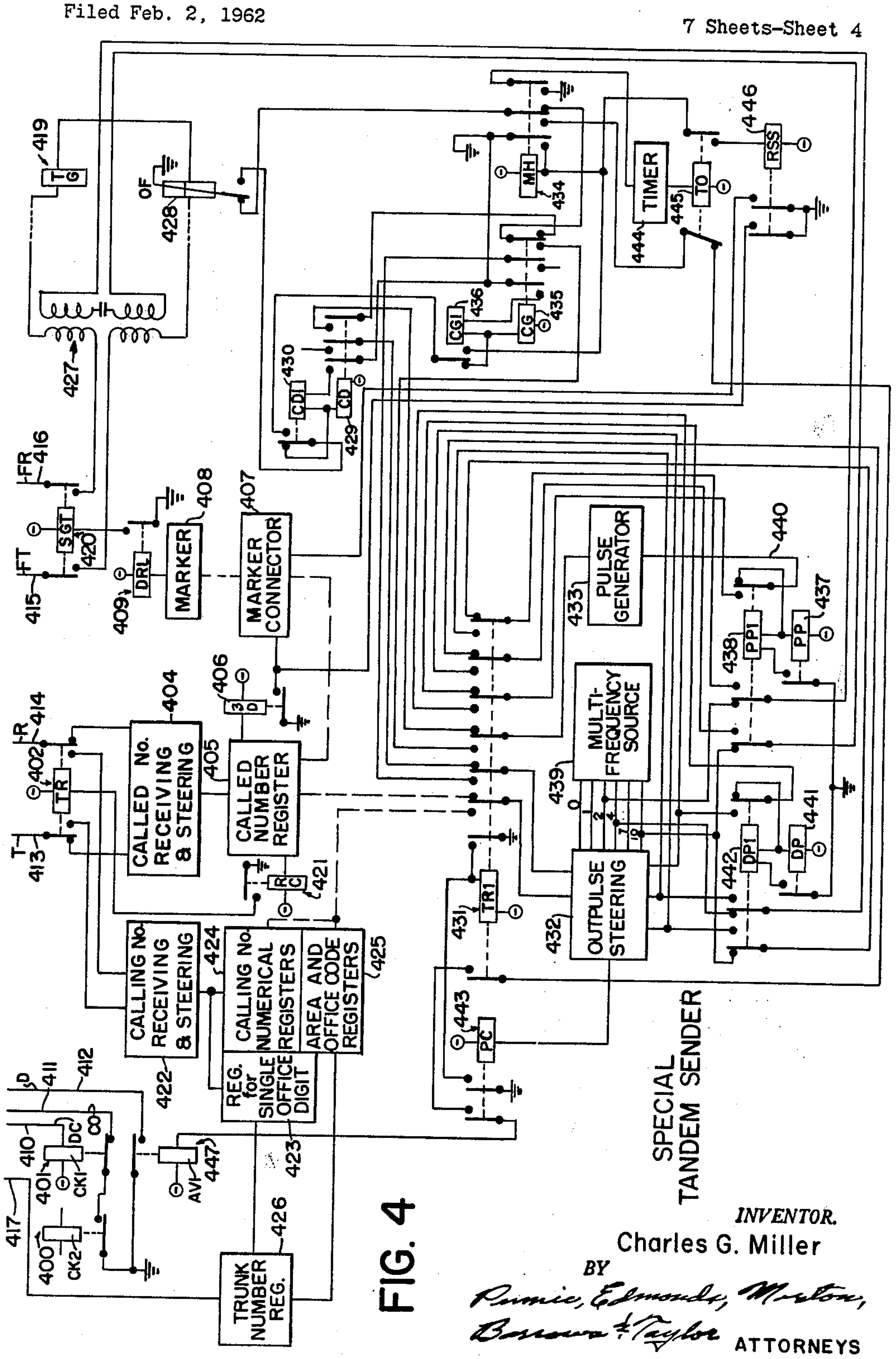
FIG. 4 shows a special tandem sender.

With conductor 307 grounded, special sender connector 308 operates to connect the trunk circuit of FIG. 3 with the tandem sender shown in FIG. 4. When connector 308 has operated and certain preliminary functions have taken place in the sender, relay 400 operates, closing a circuit from ground over its front contact, back contact of relay 401, conductor 411, through connector 308, conductor 311, to battery through the winding of relay 303. Relay 303 operates in this circuit, disconnecting incoming conductor 300 from the winding of relay 304 and extending it over a front contact of relay 303, conductor 313, through connector 308, conductor 413, back contact of relay 402 to the called number receiving and steering circuit 404. Relay 303 also disconnects incoming conductor 301 from the winding of relay 304 and extends it over a front contact of relay 303, conductor 314, through connector 308, conductor 414, back contact of relay 402 to the called number receiving and steering circuit 404. Relay 303 also opens the start circuit for connector 308, but the connector is now held from the sender.

The transfer of conductor 300 and 301 from the windings of relay 304 to the receiving circuit in the sender causes the control equipment 103 in the originating office to transmit the called line number to the receiving circuit 404, which operates the called number register 405 in accordance with the number received.

When the first three digits of the called number have been received, usually representing the area code of the area in which the called office is located, relay 406 is operated. Relay 406 causes the operation of the marker connector 407, which connects the marker 408 with the sender. The marker 408 functions in the usual manner to select an available route leading toward the wanted office, after which it selects an idle trunk leading to the first office in the selected route and connects the incoming trunk to the selected trunk. When the marker has completed its functions, it operates relay 409, which in turn operates relay 420 to prepare the outpulsing circuit.

When the called number has been completely recorded in register 405, relay 421 is operated, in turn operating relay 402. Relay 402 disconnects conductors 413 and 414 from receiving circuit 404 and connects them with the calling number receiving and steering circuit 422.

At the originating office, the completion of the sending of the called number is indicated to trunk 105. Trunk 105 thereupon operates the automatic number identification equipment, operating link 106 to connect with outpulser 107. Outpulser 107 connects with identifier 108, which signals the trunk 105 to apply a characteristic tone to the sleeve conductor of the connection leading back to the calling number network. This tone appears on directory sleeve terminal 111, which is cross-connected in accordance with the directory number of the calling station to the number network 109. The identifier 108 scans the number network and transmits the number as identified to the outpulser 107. Where a number of originating offices are located in the same building, the identifier is equipped to identify the office in which the calling station is located and indicates the office identity to the outpulser by a single digit.

When identification is complete, the outpulser transmits the single office digit and the calling number to the tandem office. At the tandem office, the office digit is received by receiving circuit 422, which steers the single office digit to register 423 and the calling number to register 424. When connector 308 operated, it transmitted the identity of the trunk over a group of conductors, indicated by conductor 417 to the trunk number register 426 in the sender. From the trunk number the building at which the call originated can be determined. The offices located in the building are known, together with the single digit assigned to each office for automatic message accounting. Therefore, by suitable cross-connections controlled by the trunk number register 426 and the single digit office register 423, the area code and office code are set up in the area and office code registers 425.

When the marker has completed its operation and the connection with the intermediate office has been completed, relay 409 is operated as previously described. Relay 409, in turn, operates relay 420 which completes a trunk test circuit which may be traced from trunk conductor 315, through connector 308, conductor 415, front contact of relay 420, lower left winding of repeating coil 427, through the lower winding of polarized relay 428, which is polarized by a local circuit through its upper winding, winding of test relay 419, upper left winding of repeating coil 427, front contact of relay 420, conductor 416, through the connector 308 to trunk conductor 316. The circuits which complete this circuit at the intermediate office have not been shown. If the circuit is satisfactory, relay 419 operates to prepare the tandem sender for outpulsing and the equipment at the intermediate office operates the sender link to connect the incoming trunk to the sender. While the sender link is being operated, the intermediate office transmits a signal which causes relay 428 to close its right contact. A circuit is thereby closed from ground over the right contact of relay 428, back contact of relay 430, to battery through the winding of relay 429. Relay 429 operates and locks through the winding of relay 430 to off-normal ground, but relay 430 cannot operate at this time, being shunted by the operating circuit of relay 429. Relay 429 closes a circuit over its front contact and a back contact of relay 431 to prepare the outpulse steering circuit 432 for operation. It also prepares a circuit for operating the pulse generator 433.

When the sender at the intermediate office is ready to receive pulses, it causes the current flow through the winding of relay 428 to be reversed, so that relay 428 closes its left contact. The ground connected over the left contact of relay 428 completes a circuit over a back contact of relay 434, back contact of relay 435, front contact of relay 429, back contact of relay 431 to the pulse generator 433, causing the pulse generator to start to generate timed pulses which control the transmission of multifrequency pulses to the intermediate office.

At the start of pulsing, the right winding of repeating coil 427 is connected over back contacts of relay 438 to two frequency sources in the multifrequency source 439, which, for convenience may be identified as sources 2 and 10. Current from these sources are transmitted through the repeating coil 427 to the sender at the intermediate office as a start signal, to prepare that sender for receiving the coded pulses.

At the first operation of the pulse generator 433, ground is connected to conductor 440 and over the back contact of relay 438 to battery through the winding of relay 437, causing that relay to operate, locking through the winding of relay 438 to off-normal ground. Relay 438 does not operate at this time, since it is shunted by the operating circuit of relay 437.

After an interval, generator 433 removes ground from conductor 440, permitting relay 438 to operate. Relay 438 opens its back contacts, disconnecting the right windings of repeating coil 427 from sources 2 and 10 to terminate the start pulse.

Since this tandem sender is particularly designed for the handling of data calls, the operation of relay 438 extends the right windings of repeating coil 427 over its front contacts, back contacts of relay 431, back contacts of relay 442 to sources 4 and 10 of the multifrequency source 439 as an indication to the intermediate office that it is to handle a data call.

At the next connection of ground to conductor 440, a circuit is completed over front contact of relay 438, back contact of relay 431, back contact of relay 442 to battery through the winding of relay 441. Relay 441 operates in this circuit and locks through the winding of relay 442 to off-normal ground. Relay 442 does not operate until the pulse generator 433 removes ground from conductor 440.

When relay 442 operates, conductor 440 is extended over front contact of relay 438, back contact of relay 431 and front contact of relay 442 to the outpulse steering circuit 432. Likewise the outpulsing circuit through the right windings of repeating coil 427 is extended over front contacts of relay 438, back contacts of relay 431 and front contacts of relay 442 to the outpulse steering circuit 432. Thereafter, under the control of the pulse generator 433, the outpulse steering circuit 432 transmits code pulses representing the called number as registered in register 405.

When the outpulse steering circuit 432 completes its operation, it operates relay 443, which in turn operates relay 431, the latter relay locking to off-normal ground. The operation of relay 431 stops the pulse generator and relay 428 holds its left contact closed while the connection is extended through one or more intermediate offices.

Figure 5:
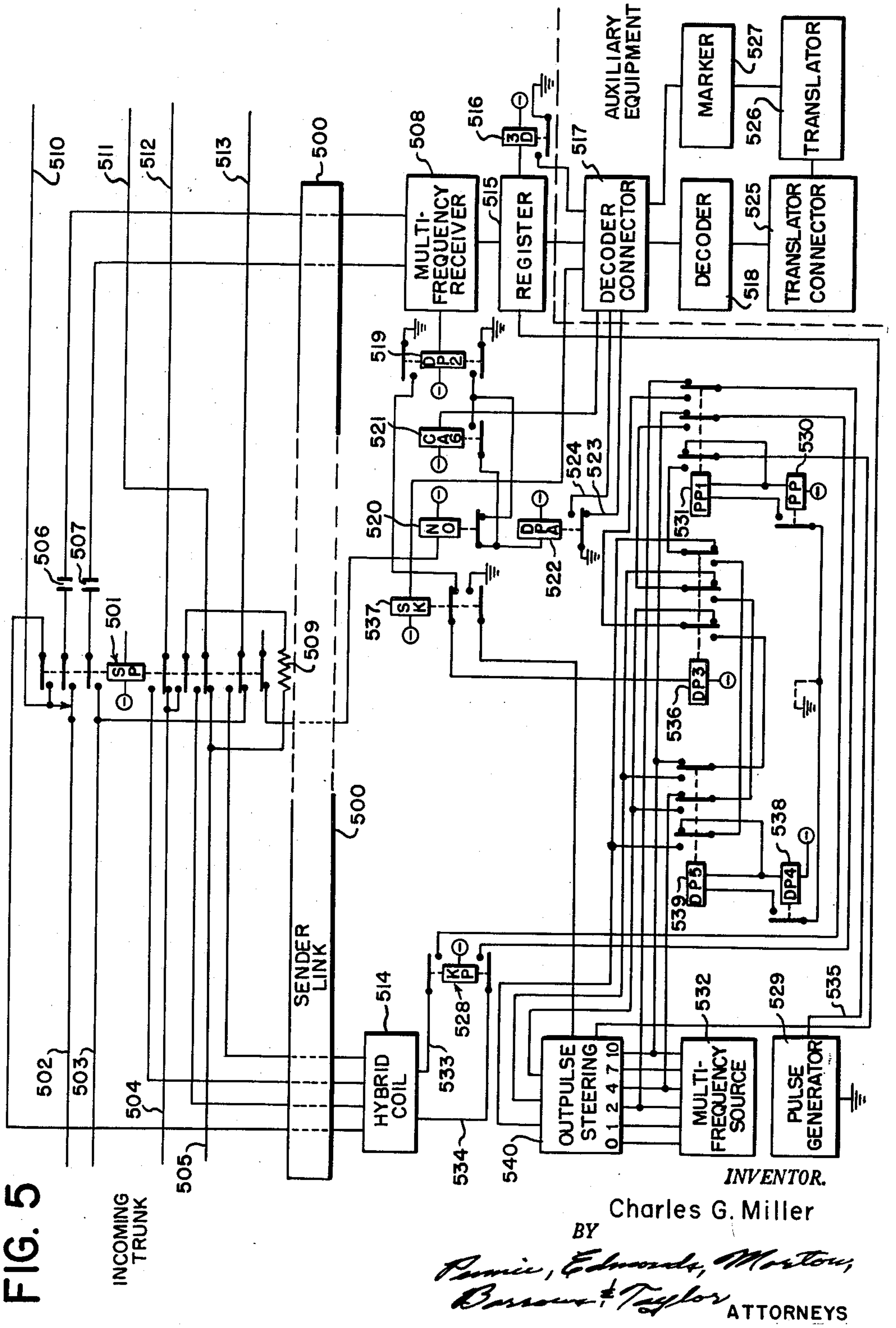
FIG. 5 shows equipment at an intermediate toll office.

The showing of an intermediate toll office in FIG. 5 is largely limited to the modifications required to permit data calls to be handled. Throughout the toll network, four-wire trunks are used as shown in FIG. 5. To connect with two-wire local offices, suitable outgoing trunk circuits are provided at the local and toll offices, together with suitable supervisory signal equipment, none of which have been shown.

When a call is received at the intermediate office of FIG. 5, the sender link 500 is operated and relay 501 is operated as described in the above-identified Gooderham et al. patent. With relay 501 operated, incoming conductors 502 and 503 are extended through condensers 506 and 507 and the sender link 500 to the multifrequency receiver 508. Incoming conductors 504 and 505 are connected together through resistor 509. Outgoing conductors 510, 511, 512 and 513 are extended through sender link 500 to hybrid coil 514. The multifrequency pulses incoming over conductors 502 and 503 are received by the receiver 508 and registered in register 515. When three digits of the wanted number have been received, relay 516 is operated, to in turn operate decoder connector 517 and connect an idle decoder 518 with the sender.

As described in connection with the tandem office, the called number is preceded by a start signal and a data signal. The start signal prepares the receiver 508 for registering coded multifrequency signals, each of which comprises two of the frequencies identified as frequencies 0, 1, 2, 4, and 7 in FIG. 4. Since the data signal does not comprise two of the above-mentioned frequencies, no registration is made, but relay 519 is operated. For the usual telephone call, relay 519 is, of course, not operated.

It should be obvious that the data signal referred to could be designed as a secondary start signal which is recognized as identical to the regular start signal by all intermediate offices in the switch train except the office just before the terminating office. For this latter intermediate office the secondary start signal is taken both as a start signal and as a directive to act in a special way called for in this invention. For other intermediate offices no modifications are necessary. This minimizes the cost of introducing to existing systems the features called for in this invention.

As described in the above-identified Gooderham et al. patent, the selection of an outgoing trunk is under the control of a marker 527 which receives its instructions from a card translator 526. The decoder 518 selects a translator and a particular card in accordance with the first three or the first six digits registered. As previously described, a special sender is required at the terminating office for data calls and therefore, when an intermediate office is extending such a call to the terminating office a special trunk must be selected. Because there will be regular telephone calls going to the same terminating office, means must be provided to discriminate between such calls. For this purpose, two spare tabs on the translator cards are employed and the corresponding code bars are selected under the control of the data signal relay 519. Two cards will be provided for each terminating office, having data receiving equipment, one of which will be used for telephone calls and the other for data calls. Since discrimination is required only for calls going to a terminating office, means is also provided for selecting a data card only when a terminating call is to be expected.

A terminating call may be expected if the incoming trunk is not of the "via-only" class, in which case relay 520 will not be operated by the trunk. In addition, where six digit translation is required, it may result in a terminating call. In such a case, the first use of the translator will operate relay 521. With data relay 519 operated and either relay 520 non-operated or relay 521 operated, relay 522 is operated. With relay 522 non-operated, in the case of a non-data or telephone call or of an intertoll call, ground is connected to conductor 523, and only a single card need to be provided for the selected route. If relay 522 is operated, ground is connected to conductor 524 to select the data card of the pair relating to the same office. If, in the case of a six digit translation, a terminating offiice is not reached, the two cards, selected with conductor 523 or 524 grounded, may be identical.

The intermediate office is also arranged to pass the data signal on to other toll offices, but to omit the data signal when a terminating office is reached. When marker 527 has completed its operation in connection with an intertoll call, and the distant sender is ready to receive the called number designation, relay 528 is operated to prepare the outpulsing circuit and the pulse generator 529 is started. The outpulsing circuit is established when relay 528 is operated and conductors 533 and 534 are connected from the input of the hybrid coil 514 over front contacts of relay 528, back contacts of relay 531 to the 2 and 10 sources of multifrequency source 532, thereby transmitting a start signal to the distance office through the hybrid coil to conductors 510, 511, 512 and 513. At the first operation of pulse generator 529, ground is connected to conductor 535, completing a circuit over a back contact of relay 531 to battery through the winding of relay 530. Relay 530 operates in this circuit and locks through the winding of relay 531 to off-normal ground. Relay 531 does not operate, being shunted by the operating circuit of relay 530. When pulse generator 529 removes ground from conductor 535, relay 531 operates in the locking circuit of relay 530.

Whether or not a data signal is now transmitted depends on whether or not relay 536 is operated. Relay 536 is operated if an incoming data signal has been received, as indicated by the operation of relay 519, and the call is being extended to another toll office as indicated by the non-operation of relay 537. Relay 537 is operated by the marker when the area code digits and office code digits are not to be transmitted, because the call has reached a terminating office.

With relay 536 operated, as soon as relay 531 operates, conductor 535 is extended over front contact of relay 531, front contact of relay 536, back contact of relay 539 to battery through the winding of relay 538. When pulse generator 529 again connectes ground to conductor 535, relay 538 operates and locks through the winding of relay 539 to off-normal ground, but relay 539 does not operate until ground is removed from conductor 535 at the end of the data pulse. With relay 531 operated, the outpulsing circuit extends from hybrid coil 514 through the contacts of relay 528, then over front contacts of relay 531, front contacts of relay 536 and back contacts of relay 539 to the 4 and 10 sources of multifrequency source 532, thereby transmitting the data signal to the remote toll office.

When ground is removed from conductor 535, relay 539 operates and extends conductor 535 and the outpulsing circuit to the outpulse steering circuit 540 which controls the transmission of the wanted line number to the distant office. When outpulsing has been completed relay 501 is released and the talking circuit and the supervisory signalling circuit are cut through to the next office.

If relay 536 is not operated, the operation of relay 531 connects the pulse generator 529, conductor 535 and the outpulsing circuit over front contacts of relay 531 and then over the back contacts of relay 536 directly to the outpulse steering circuit 540. If relay 537 is operated to prevent the operation of relay 536, it also controls the outpulse steering circuit to skip the neccessary digits as previously indicated.

Figure 6:
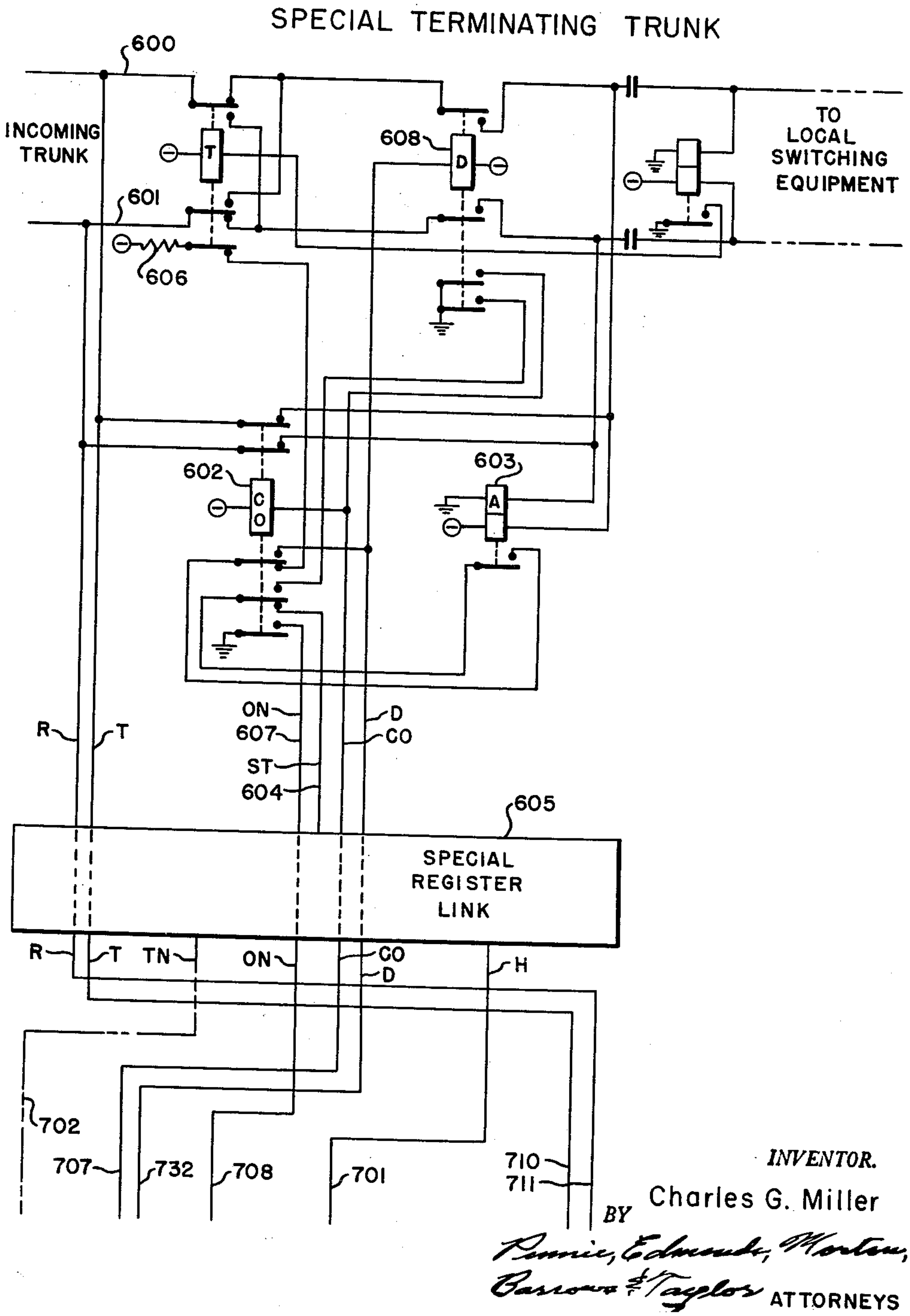
FIG. 6 shows a special trunk incoming to a terminating office.
Figure 7:
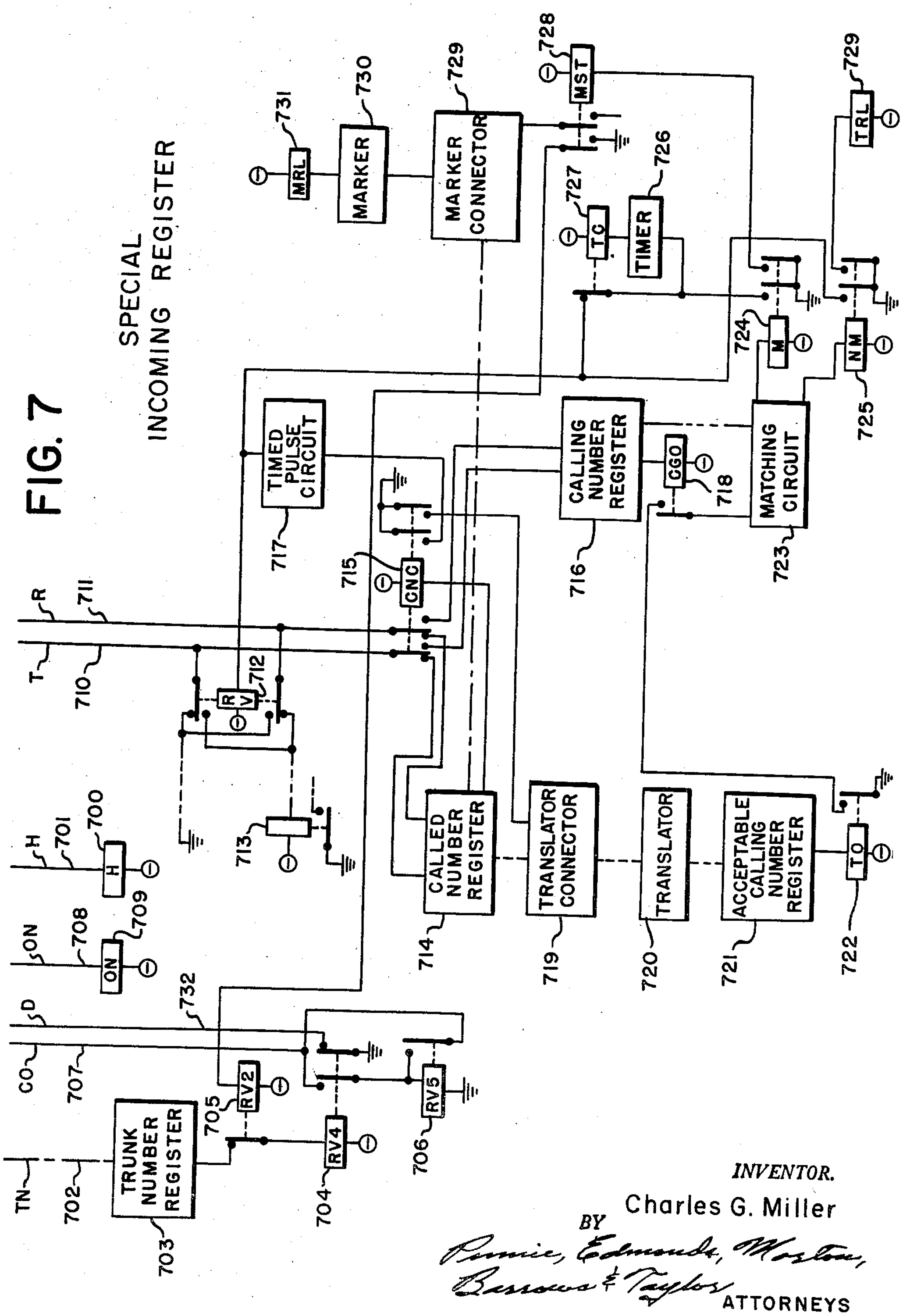
FIG. 7 shows a special incoming register at the terminating office.

The circuits shown in FIGS. 6 and 7 are those required in the terminating office for a data call. The trunk circuit and register link of FIG. 6 are of standard design, but have access only to special incoming registers, as shown in FIG. 7, which are designed for handling data calls.

When a data call reaches the trunk of FIG. 6, a bridge located in a sender at a distant office, is connected across incoming conductors 600 and 601, completing a circuit from battery, through the lower winding of relay 603, back contact of relay 602, conductor 600, through the bridge at the distant office, conductor 601, back contact of relay 602, to ground through the upper winding of relay 603. Relay 603 operates in this circuit and closes a circuit from battery, through resistor 606, back contact of relay 602, front contact of relay 603, back contact of relay 602 to the start conductor 604 of the special register link 605, operating the register link to connect the trunk of FIG. 6 with the incoming register of FIG. 7. When the link 605 has operated, conductor 701 is grounded and relay 700 is operated in the register, holding the link operated under the control of the register. With the link 605 operated, the identity of the trunk is passed to the register by selectively grounding conductors in cable 702 in accordance with the trunk number and thereby operating the trunk number register 703. This procedure is more fully described in the Busch patent identified above. When the trunk number has been registered, relay 704 is operated over the back contact of relay 705. With relay 704 operated, a circuit is closed from ground through the winding of relay 706, front contact of relay 704, conductor 707, through the link 605 to battery through the winding of relay 602. Relay 602 operates in this circuit, disconnecting relay 603 from the trunk conductors 600 and 601, and connecting ground to conductor 607, which extends through the link 605 to conductor 708 and the winding of relay 709 to indicate to the register that it may proceed. Relay 706 also operates in series with relay 602 and locks to conductor 707, independent of relay 704.

When the link has operated, conductor 600 is extended through the link to conductor 710, back to contact of relay 712 to ground and conductor 601 is extended through the link to conductor 711, back contact of relay 712 and then to the battery through the winding of relay 713. Relay 713 operates in this circuit and prepares the register for receiving the called number.

It will be noted that the connections of battery and ground provided by the register are reversed from those provided by the trunk. The bridge across conductors 600 and 601 is located in a sender at the intermediate office. which recognizes this battery and ground reversal as a signal that it may proceed to transmit the called number. The called number as transmitted over conductors 600 and 601 is registered in the called number register 714. When the intermediate office has finished sending the called number, the talking and signaling circuits are completed through that office, so that the register of FIG. 7 is now connected over the talking and signaling circuits with the tandem sender of FIG. 4.

When the called number register 714 has been operated, relay 715 is operated, transferring the talking conductors 710 and 711 from called number register 714 to calling number register 716. In addition, relay 715 closes a circuit for operating timed pulse circuit 717. This timed pulse circuit 717 first measures a time interval to permit the intermediate office to establish the talking and signaling circuits and to release its sender. The timing circuit 717 then operates to release relay 712 to transmit a timed reverse battery signal to the outgoing trunk at the intermediate office, from which it is transmitted over the signaling path through the intermediate offices to the sender at the tandem office.

At the special tandem sender in the tandem office of FIG. 4, relay 428 responds to this signal by closing its right contact. When relay 428 closes its right contact, it completes a circuit over that contact, front contact of relay 430, back contact of relay 436 to battery through the winding of relay 435. Relay 435 operates and locks through the winding of relay 436 to off-normal ground, relay 436 remaining unoperated until relay 428 opens its right contact. Relay 435 also prepares the outpulse steering circuit 432 for operation.

When the reverse battery signal ends, relay 428 closes its left contact, completing a circuit from ground over that contact, back contact of relay 434, front contact of relay 435, front contact of relay 431 to the pulse generator 433. The first ground pulse over conductor 440 operates relay 437, followed by relay 438, to transmit the start pulse to the terminating office. With relay 431 operated, the second pulse on conductor 440 is transmitted over front contact of relay 438, front contact of relay 431 to the outpulse steering circuit, omitting the data pulse. With relay 431 operated, the control of the digits to be outpulsed is transferred from the called number register 405 to the area code, office code and calling number registers 425 and 424. When the complete calling number has been transmitted, the outpulse steering circuit 432 reoperates relay 443.

At the terminating office register, the complete calling number is received and registered by calling number register 716. When the registration is completed, relay 713 is operated.

In the meantime, the operation of relay 715, in response to the complete registration of the called number, operates translator connector 719, to connect the called number register 714 with translator 720. This translator may conveniently be of the card type employed in toll offices. The card will be selected in accordance with the called number and will be punched to register the complete number of the calling number which is privileged to extend data sending connections to the data receiving unit identified by the called number. When the number of the acceptable calling station has been set up in register 721, relay 722 is operated. With relays 722 and 718 operated, the matching circuit 723 is operated. The calling number automatically derived from the line itself and registered in register 716 is transferred to the matching circuit 723, as well as the calling number indicated by the translator as acceptable by the called data unit.

Matching circuits of this type are used in toll offices, such as disclosed in the above-identified Gooderham et al. patent, for area code matching and in tandem offices, such as disclosed in the above-identified Breed et al. patent for identifying lines requiring service observation.

If the two calling numbers are the same, "match" relay 724 is operated. If the two calling numbers are not the same "no-match" relay 725 is operated.

Assuming the two numbers match, relay 724 closes a circuit from ground over its front contact, back contact of relay 727 to battery through the winding of relay 712, operating relay 712 to send a reverse battery signal to the tandem office. At the same time, relay 724 starts timer 726, which, after an appropriate interval, operates relay 727. Relay 727 opens the circuit of relay 712, to terminate the reverse battery signal.

Since the operation of relay 724 indicates that it is permissible to complete the connection, relay 724 also operates marker start relay 728. With relay 728 operated, marker connector 729 connects an idle marker 730 with the register and the marker proceeds to set up the connection with the data receiving station identified by the called number as registered in register 714. Relay 728 also operates relay 705, opening the circuit of relay 704, causing the latter relay to release. With relay 704 released, ground is connected over conductor 732, through the register link 605 to battery through the winding of 608. Relay 608 operates in this circuit and, at its front contacts, connects relay 603 to conductors 600 and 601, causing relay 603 to reoperate. With relay 603 reoperated, relay 608 locks over a circuit extending from battery through the winding of relay 608, front contact of relay 602, front contact of relay 603, a second front contact of relay 602, to ground at a front contact of relay 608. Relay 608 also provides a holding circuit for relay 602 so that the latter relay remains operated after the register is disconnected, which takes place after the marker has completed the desired connection and operates the release relay 731.

At the tandem office, the reverse battery signal transmitted under the control of the "match" relay 724 causes relay 428 to close its right contact, completing a circuit from ground over the right contact of relay 428, front contact of relay 430, front contact of relay 436 to battery through the winding of relay 434. Relay 434 operates in this circuit, locks to off-normal ground and closes a circuit for starting the operation of timer 444, which measures a time interval longer than that measured by timer 726 at the terminating office before operating relay 445.

When the reverse battery signal is removed under the control of timer 726, relay 428 closes its left contact and, with relay 445 not operated, completes a circuit from ground through left contact of relay 428, front contact of relay 434, back contact of relay 445, front contact of relay 431, front contact of relay 443 to battery through the winding of relay 447. Relay 447 operates in this circuit and connects ground to conductor 412, which extends through the sender connector 308 to conductor 312 and battery through the winding of relay 305. Relay 305 operates, in turn operating relay 302. Relay 302 closes a circuit from ground over the back contact of relay 306, front contact of relay 303, front contact of relay 302, conductor 310, through connector 308 to conductor 410 and battery through the winding of relay 401. Relay 401 operates, opening the circuit of relay 303 and causing that relay to release. The operation of relay 302 and the release of relay 303 disconnects incoming conductors 300 and 301 from the sender and extends them through the left windings of repeating coils 317 to the windings of relay 304, which now reoperates. Relay 304, reoperated, provides a locking circuit for relay 305. When relay 303 releases a circuit is closed from ground over front contact of relay 302, back contact of relay 303 to battery through the winding of relay 306. Relay 306 operates and locks under the control of relay 302, which is in turn held operated under the control of relay 305. The release of relay 303 disconnects ground from the circuit of relay 401 in the sender, permitting that relay to release. Relay 305, in operating, opened the start circuit for the connector 308, to prevent its reclosure when relay 304 reoperates and relay 303 releases. Relay 302, when operated, connects supervisory relay 320 through the right windings of repeating coil 317 to outgoing conductors 315 and 316. The sender and sender connector are restored to normal in the usual manner.

If the two calling numbers presented to the matching circuit 723 do not match, "no-match" relay 725 is operated as previously stated. With relay 725 operated, ground is connected to the winding of relay 712 to cause a prolonged reverse battery signal to be transmitted to the tandem sender. Relay 725 also operates the trouble release relay 729 which brings about the release of the register.

At the tandem sender, this prolonged reverse battery signal causes relay 428 to close its right contact, operating relay 434 as previously described. Relay 434 also starts timer 444 which operates relay 445. With relay 445 operated, the locking circuit for relay 434 is extended to battery through the winding of relay 446. With relay 446 operated, the marker connector 407 is operated, connecting an idle marker with the tandem sender, and the marker is given an indication that it is to make a trouble record of the call and cause a signal to be transmitted to the calling line that the connection cannot be completed.

For convenience, the circuits have been shown as relating to access from a single calling line. However, if it were desired to give a number of calling lines access to a particular called line, an arrangement similar to the "card-to-card" operation described in the above-identified Gooderham et al. patent might readily be used. The translator 720 would be provided with a card for each acceptable calling line. The card first selected might well be the one carrying the designation of the calling line making the greatest use of the called equipment. In any event, the first card would carry an indication that a plurality of cards are available and, if there were no match, would start a chain operation by which each of the cards would be selected, one after the other. A match on any card would immediately operate "match" relay 724. The last card of the group would carry the "no-match" indication to operate "no-match" relay 725. Intermediate cards would carry an indication which would control the chain operation.

It will therefore be apparent that the present invention provides means for positively preventing the completion of an unauthorized connection with the data receiving unit. While the operations have been, for convenience, described as relating to data transmission, it will be apparent that they are equally useful whenever it would be desirable to give only limited access to a particular line.

I claim:

1. In a telephone switching system, subscriber stations having unique designations, each comprising a group of decimal digits, switching equipemnt adapted to be controlled by a dialed or keyed designation for connecting a calling station with a called station, means in the switching equipment having access to said calling station to identify and register the designation of said calling station, control means serving the switching equipment having access to said called station, means to record in said control means the designation of a station authorized to be connected with said called station, means to transmit the called station designation and the identified calling station designation to said control means, translator means accessible to said control means and means under the control of said translator means to cause said last mentioned switching equipment to complete the connection of said calling station with said called station effective only if said identified calling station designation is the same as said authorized station designation.

2. In a telephone switching system, subscriber stations having unique designations, each comprising a group of decimal digits, switching equipment controlled by a dialed or keyed designation for connecting a calling station with a called station, means in the switching equipment having access to said calling station to identify and register the designation of said calling station, control means serving the switching equipment having access to said called station, means to record in said control means the designations of one or more stations authorized to be connected with said called station, means to transmit the called station designation and the identified calling station designation to said control means, translator means accessible to said control means and means under the control of said translator means to cause said last-mentioned switching equipment to complete the connection of said calling station with said called station effective only if said identified calling station designation is the same as any one of said authorized station designations.

3. In a telephone or data switching system, subscriber stations having unique designations, each comprising a group of decimal digits, switching equipemnt controlled by a dialed or keyed designation for connecting a callling station with a called station, means in the switching equipment having access to said calling station to identify and register the designation of said calling station, control means serving the switching equipment having access to said called station, means to record in said control means the designation of a station authorized to be connected with said called station, means to transmit the called station designation and the identified calling station designation to said control means, means to record said called station designation and said identified calling station designation in said control means, matching means accessible to said control means, means to transmit said identified calling station designation to said matching means, means under the control of said recorded called station designation to transmit the authorized station designation to said matching means, and means under the conrol of said matching means to cause said last-mentioned switching equipment to complete the connection of said calling station with said called station effective only if said identified calling station designation is the same as said authorized station designation.

4. In a telephone switching system, subscriber stations having unique designations each comprising a group of decimal digits, switching equipment controlled by a dialed or keyed designation for connecting a calling station with a called station, means in the switching equipment having access to said calling station to identify and register the designation of said calling station, control means serving the switching equipment having access to said called station, means in said control means to record the designations of a plurality of stations authorized to be connected with said called station, means in said control means to register said called station designation and said identified calling station designation when transmitted thereto, matching means accessible to said control means, means to transfer said identified calling station designation to said matching means, means under the control of said registered called station designation to transfer said authorized station designations, one at a time, to said matching means, and means under the control of said matching means to cause said switching equipment to complete the connection of said calling station with said called station effective only if said identified calling station designation is the same as any one of said authorized station designations.

5. In a telephone switching system, subscriber stations having unique designations, each comprising a group of decimal digits, switching equipment controlled by a dialed or keyed designation for connecting a calling station with a called station, means in the switching equipment having access to said calling station to identify and register the designation of said calling station, control means serving the switching equipment having access to said called station, means to record the designations of a plurality of stations authorized to be connected with said called station, means in said control means to register said called station designation and said identified calling station designation when transmitted thereto, matching means accessible to said control means, means to transfer said identified calling station designation to said matching means, means under the control of said registered called station designation to transfer said authorized station designations, one at a time, to said matching means, and means under the control of said matching means for disconnecting all of said switching equipment from said calling station if said identified calling station designation is not the same as any one of said authorized station designations.

6. In a telephone switching system, subscriber stations having unique designations each comprising a group of decimal digits, switching equipment controlled by a dialed or keyed designation for connecting a calling station with a called station, means in the switching equipment having access to said calling station to identify and register the designation of said calling station, a tandem office through which the connections between said calling station and said called station is directed, means in said tandem office to store said identified calling line designation, control means serving the switching equipment having access to said called station, means in said control means to record the designation of a plurality of stations authorized to be connected with said called station, means in said control means to register said called station designation and transmit a signal to said tandem office, to cause said tandem office to transmit said stored calling line designation to said control means, matching means accessible to said control means, means to transfer said identified calling station designation to said matching means, means under the control of said registered called station designation to transfer the designations of said authorized stations, one at a time, to said matching means, and means under the control of said matching means to cause said switching equipment to complete the connection of said calling station with said called station effective only if said identified calling station designation is the same as any one of said authorized station designations.

References Cited by the Examiner

UNITED STATES PATENTS

| | | | |
|---|---|---|---|
| 1,492,995 | 5/24 | Lubberger | 179—18 |
| 2,352,492 | 6/44 | Ostline | 179—7.1 |
| 2,402,700 | 6/46 | Williams | 179—7.1 |
| 2,918,553 | 12/59 | Leonard et al. | 179—18 |
| 3,025,357 | 3/62 | Jacobitti et al. | 179—18 |

ROBERT H. ROSE, *Primary Examiner.*

WALTER L. LYNDE, *Examiner.*

UNITED STATES PATENT OFFICE
CERTIFICATE OF CORRECTION

Patent No. 3,189,687 June 15, 19

Charles G. Miller

It is hereby certified that error appears in the above numbered patent requiring correction and that the said Letters Patent should read as corrected below.

Column 1, line 22, for "designations" read -- designatior --; column 7, line 35, strike out "to"; line 53, for "distance read -- distant --; column 8, line 72, strike out "to", seconc occurrence; column 9, line 57, for "713" read -- 718 --; column 10, line 69, for "coils" read -- coil --; column 11, li 58 and column 12, line 22, for "equipemnt", each occurrence, read -- equipment --.

Signed and sealed this 30th day of November 1965.

(SEAL)
Attest:

ERNEST W. SWIDER
Attesting Officer

EDWARD J. BRENNER
Commissioner of Patents